US012055880B1

(12) United States Patent
Endo

(10) Patent No.: US 12,055,880 B1
(45) Date of Patent: Aug. 6, 2024

(54) FIXING DEVICE WITH GUIDE PORTION

(71) Applicant: Toshiba Tec Kabushiki Kaisha, Tokyo (JP)

(72) Inventor: Sasuke Endo, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/118,070

(22) Filed: Mar. 6, 2023

(51) Int. Cl.
*G03G 15/20* (2006.01)

(52) U.S. Cl.
CPC ..... *G03G 15/2057* (2013.01); *G03G 15/2064* (2013.01)

(58) Field of Classification Search
USPC .......................................................... 399/328
See application file for complete search history.

(56) References Cited

U.S. PATENT DOCUMENTS 6,185,383 B1 * 2/2001 Kanari ............... G03G 15/2042 399/334
2004/0218949 A1 * 11/2004 Fukuzawa .......... G03G 15/2053 399/328
2007/0065191 A1 * 3/2007 Iwasaki ............. G03G 15/2028 399/329
2019/0286026 A1 9/2019 Furuichi et al.
2019/0286027 A1 9/2019 Someya et al.
2020/0209791 A1 7/2020 Seki
2021/0132526 A1 5/2021 Miyashita et al.

FOREIGN PATENT DOCUMENTS

JP 2001-066925 A 3/2001
JP 2015-004918 A 1/2015
JP 2016-186569 A 10/2016
JP 2017-072781 A 4/2017

* cited by examiner

*Primary Examiner* — Quana Grainger
(74) *Attorney, Agent, or Firm* — FOLEY & LARDNER LLP

(57) ABSTRACT

A fixing device includes a film-shaped cylinder, a heater unit, and a guide portion. The heater unit is disposed inside the cylinder and includes a heating element. The guide portion can contact an inner surface of the cylinder. A standard size sheet having a maximum width among standard size sheets that are conveyed together with rotation of the cylinder while being in contact with an outer surface of the cylinder is set as a maximum standard size sheet. A position corresponding to a center portion of the maximum standard size sheet is set as a first position. A position corresponding to an end portion of the maximum standard size sheet is set as a second position. In the guide portion, a contact length with the cylinder at the second position is shorter than a contact length with the cylinder at the first position.

17 Claims, 11 Drawing Sheets

FIXING DEVICE WITH GUIDE PORTION

FIELD

Embodiments described herein relate generally to a fixing device.

BACKGROUND

An image forming apparatus that forms an image on a sheet is used. The image forming apparatus includes a fixing device. The fixing device executes a fixing process of fixing toner (recording agent) to a sheet. For the fixing device, a reduction in the period of time taken to start the fixing process is required.

DETAILED DESCRIPTION

In general, according to at least one embodiment, a fixing device includes a film-shaped cylinder, a heater unit (heater), and a guide portion. The heater unit is disposed inside the cylinder and includes a heating element of which a longitudinal direction is an axis direction of the cylinder. The guide portion is able to contact with an inner surface of the cylinder and is parallel to the heater unit in a circumferential direction of the cylinder. A standard size sheet having a maximum width in the longitudinal direction among standard size sheets that are conveyed together with rotation of the cylinder while being in contact with an outer surface of the cylinder is set as a maximum standard size sheet. A position corresponding to a center portion of the maximum standard size sheet in the longitudinal direction is set as a first position. A position corresponding to an end portion of the maximum standard size sheet in the longitudinal direction is set as a second position. In the guide portion, a contact length with the cylinder in the circumferential direction at the second position is shorter than a contact length with the cylinder in the circumferential direction at the first position.

Hereinafter, a fixing device according to at least one embodiment will be described.

Figure 1:
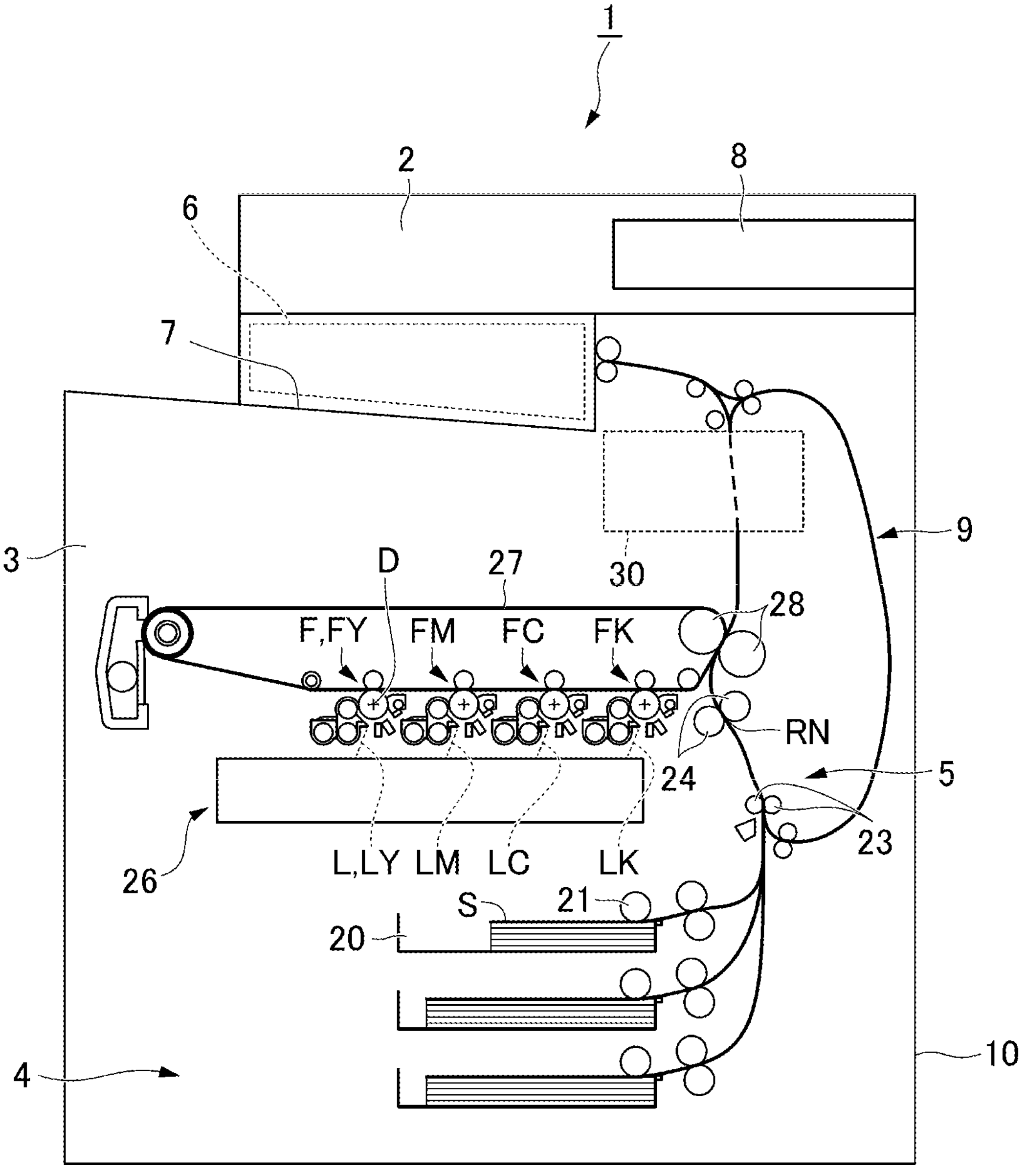
FIG. 1 is a diagram illustrating a schematic configuration of an image processing apparatus.

FIG. 1 is a diagram illustrating a schematic configuration of an image forming apparatus. For example, an image forming apparatus 1 is disposed in a workplace. The image forming apparatus 1 executes a process of forming an image on a sheet S. The sheet S may be paper. The image forming apparatus 1 includes a housing 10, a scanner unit 2, an image forming unit 3, a sheet supply unit 4, a conveying unit 5, an inversion unit 9, a tray 7, a control panel 8, and a control unit 6.

The housing 10 forms an external shape of the image forming apparatus 1.

The scanner unit 2 reads image information of an object to be copied based on brightness and darkness of light and generates an image signal. The scanner unit 2 outputs the generated image signal to the image forming unit 3.

The image forming unit 3 forms a toner image based on an image signal from the scanner unit 2 or an external device. The toner image is an image formed of toner or another material. The image forming unit 3 transfers the toner image to a surface of the sheet S. The image forming unit 3 applies heat and pressure to the toner image on the surface of the sheet S such that the toner image is fixed to the sheet S.

The sheet supply unit 4 supplies the sheet S to the conveying unit 5 one by one at a timing at which the image forming unit 3 forms the toner image. The sheet supply unit 4 includes a sheet accommodation unit 20 and a pickup roller 21.

The sheet accommodation unit 20 accommodates the sheet S having a predetermined size and a predetermined type.

The pickup roller 21 picks up the sheet S from the sheet accommodation unit 20 one by one. The pickup roller 21 supplies the picked sheet S to the conveying unit 5.

The conveying unit 5 supplies the sheet S supplied from the sheet supply unit 4 to the image forming unit 3. The conveying unit 5 includes a conveying roller 23 and a registration roller 24.

The conveying roller 23 conveys the sheet S supplied from the pickup roller 21 to the registration roller 24. The conveying roller 23 allows a tip of the sheet S in a conveying direction to abut against a nip RN of the registration roller 24.

The registration roller 24 aligns a position of the tip of the sheet S in the conveying direction by bending the sheet S in the nip RN. The registration roller 24 conveys the sheet S at a timing at which the image forming unit 3 transfers the toner image to the sheet S.

The image forming unit 3 will be described.

The image forming unit 3 includes a plurality of image forming units F, a laser scanning unit 26, an intermediate transfer belt 27, a transfer unit 28, and a fixing device 30.

The image forming unit F includes a photoconductive drum D. The image forming unit F forms the toner image corresponding to the image signal on the photoconductive drum D. A plurality of image forming units FY, FM, FC, and FK forms toner images using yellow, magenta, cyan, and black toners, respectively.

The charging unit charges a surface of the photoconductive drum D. The developing unit contains a developer including the yellow, magenta, cyan, and black toners. The developing unit develops an electrostatic latent image on the photoconductive drum D to form the toner image of each of the colors on the photoconductive drum D.

The laser scanning unit 26 deflects a laser beam L for scanning the charged photoconductive drum D such that the photoconductive drum D is exposed. The laser scanning unit 26 exposes the photoconductive drums D of the image forming units FY, FM, FC, and FK of the respective colors to laser beams LY, LM, LC, and LK, respectively, to form electrostatic latent images thereon.

The toner image on the surface of the photoconductive drum D is primarily transferred to the intermediate transfer belt 27.

The transfer unit 28 transfers the toner image primarily transferred to the intermediate transfer belt 27 to the surface of the sheet S at a secondary transfer position.

The fixing device 30 executes the fixing process. The fixing process is a process of applying heat and pressure to the toner image transferred to the sheet S such that the toner image is fixed to the sheet S.

The inversion unit 9 inverts the sheet S for forming an image on a back surface of the sheet S. The inversion unit 9 switches back the sheet S discharged from the fixing device 30 to invert front and back surfaces of the sheet S. The inversion unit 9 conveys the inverted sheet S to the registration roller 24.

In the tray 7, the discharged sheet S on which the image is formed is placed.

The control panel 8 is a part of an input unit that inputs information for allowing an operator to operate the image forming apparatus 1. The control panel 8 includes a touch panel and various hard keys.

The control unit 6 controls operations of the respective units of the image forming apparatus 1.

Figure 2:
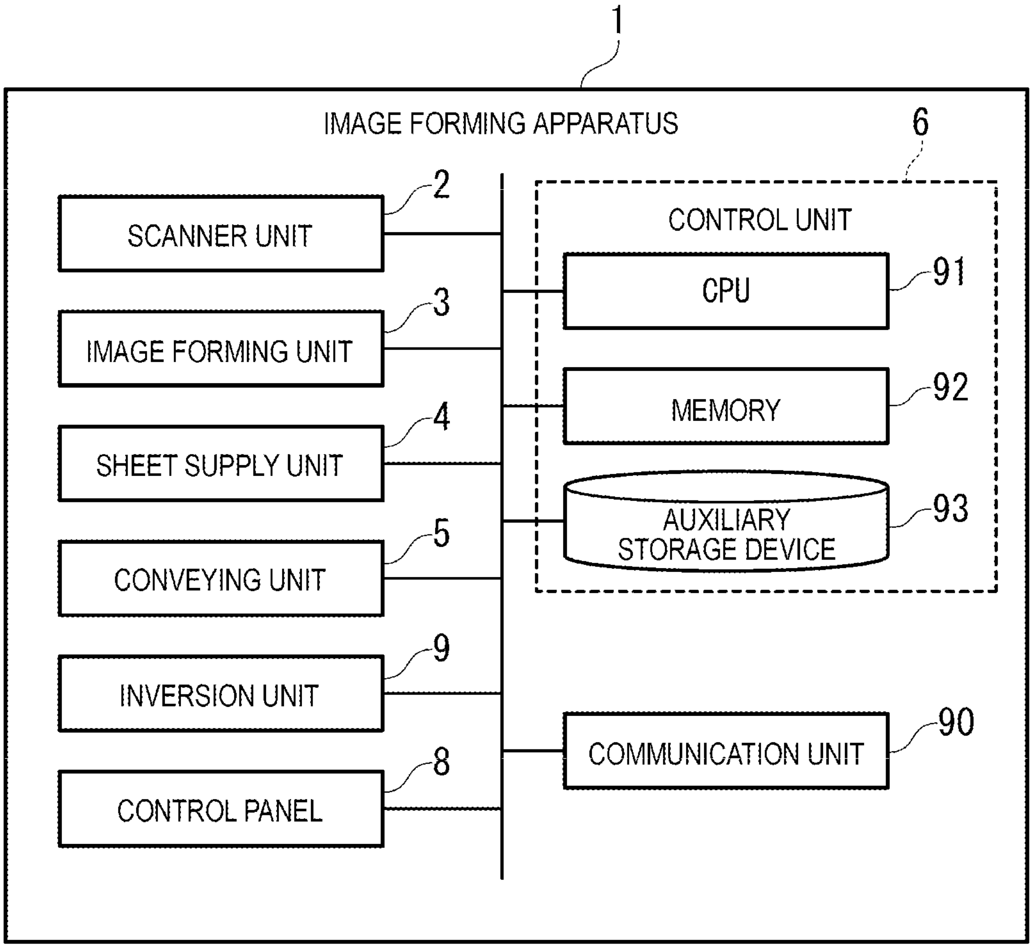
FIG. 2 is a diagram illustrating a hardware configuration of the image forming apparatus.

FIG. 2 is a diagram illustrating a hardware configuration of the image processing apparatus according to the embodiment. The image forming apparatus 1 includes a Central Processing Unit (CPU) 91, a memory 92, and an auxiliary storage device 93 connected through a bus and executes a program. By executing the program, the image forming apparatus 1 functions as an apparatus including the scanner unit 2, the image forming unit 3, the sheet supply unit 4, the conveying unit 5, the inversion unit 9, the control panel 8, and a communication unit 90.

The CPU 91 functions as the control unit 6 by executing a program stored in the memory 92 and the auxiliary storage device 93. The control unit 6 controls operations of the respective functional units of the image forming apparatus 1.

The auxiliary storage device 93 is configured using a storage device such as a magnetic hard disk device or a semiconductor memory device. The auxiliary storage device 93 stores information.

The communication unit 90 is configured to include a communication interface for connecting the image forming apparatus to an external apparatus. The communication unit 90 communicates with the external apparatus via the communication interface.

The fixing device 30 will be described in detail.

Figure 3:
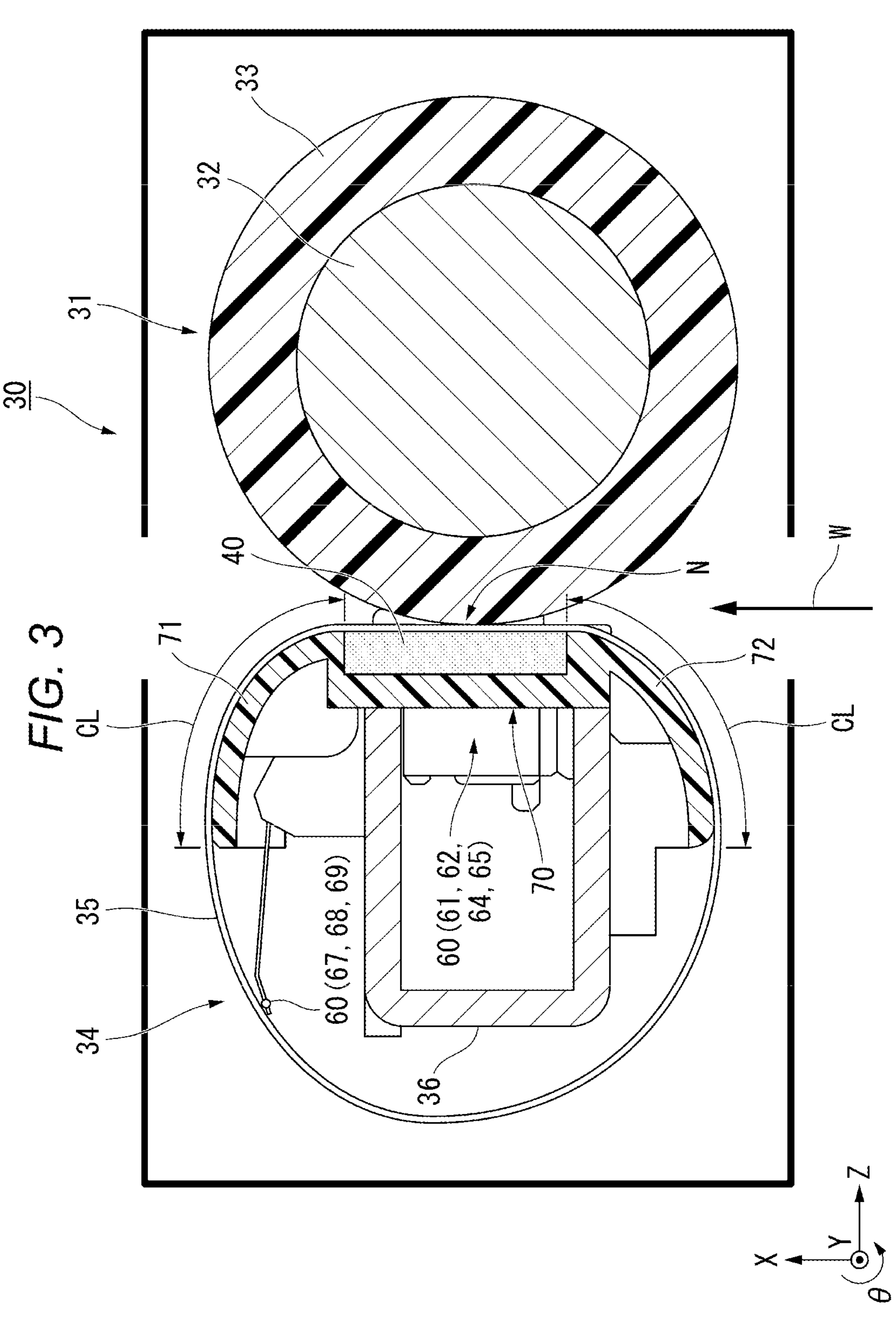
FIG. 3 is a front cross-sectional view illustrating a fixing device.

FIG. 3 is a front cross-sectional view illustrating a center portion of the fixing device 30 in a Y direction. The fixing device 30 includes a pressurization roller 31 and a heating roller 34. A nip N is formed between the pressurization roller 31 and the heating roller 34.

In the present application, a Z direction, an X direction, and the Y direction are defined as follows. The Z direction is a thickness direction of a substrate 41 of a heater unit 40 and is a direction parallel to the heating roller 34 and the pressurization roller 31. The +Z direction is a direction from the heating roller 34 toward the pressurization roller 31. The X direction is a transverse direction of the substrate 41 and is the conveying direction of the sheet S in the nip N. The +X direction is the downstream side in the conveying direction of the sheet S. The Y direction is a longitudinal direction of the substrate 41 and is an axis direction of a cylindrical film 35 of the heating roller 34.

The pressurization roller 31 pressurizes the toner image of the sheet S entered the nip N. The pressurization roller 31 includes a core 32 and an elastic layer 33. The configuration of the pressurization roller 31 is not particularly limited to the above-described example, and various configurations can be adopted.

The core 32 is formed of a metal material such as stainless steel in a cylindrical shape. The elastic layer 33 is formed of an elastic material such as a silicone rubber. The elastic layer 33 has a given thickness on an outer circumferential surface of the core 32. The release layer is formed of a resin material such as a tetrafluoroethylene-perfluoroalkyl vinyl ether copolymer (PFA), and may be provided on an outer circumferential surface of the elastic layer 33.

The pressurization roller 31 is driven to rotate by a motor. If the pressurization roller 31 rotates in a state where the nip N is formed, the cylindrical film 35 of the heating roller 34 is driven to rotate. If the pressurization roller 31 rotates in a state where the sheet S is present in the nip N, the pressurization roller 31 conveys the sheet S in a conveying direction W.

In the present application, a θ direction is a circumferential direction of the cylindrical film 35. The +θ direction is the downstream side in a rotation direction of the cylindrical film 35. In the rotation direction of the cylindrical film 35, the downstream side will be simply referred to as “downstream side”, and the upstream side will be simply referred to as “upstream side”.

The heating roller 34 heats the toner image of the sheet S entered the nip N. The heating roller 34 includes the cylindrical film (cylinder) 35, the heater unit 40, a support member 70, a frame 36, and a thermosensitive element 60. The configuration of the heating roller 34 is not particularly limited to the above-described example, and various configurations can be adopted.

The cylindrical film 35 is cylindrical. The cylindrical film 35 includes a base layer, an elastic layer, and a release layer in order from the inner circumferential side. The base layer is formed of a resin material such as polyimide (PI) in order to achieve low thermal capacity. The elastic layer is formed of an elastic material such as a silicone rubber. The release layer is formed of a material such as a PFA resin. A center portion of the cylindrical film 35 in the Y direction is in a tensionless state in the θ direction.

The heater unit 40 is provided inside the cylindrical film 35. A surface of the heater unit 40 in the +Z direction comes into contact with an inner surface of the cylindrical film 35 through a grease.

Figure 4:
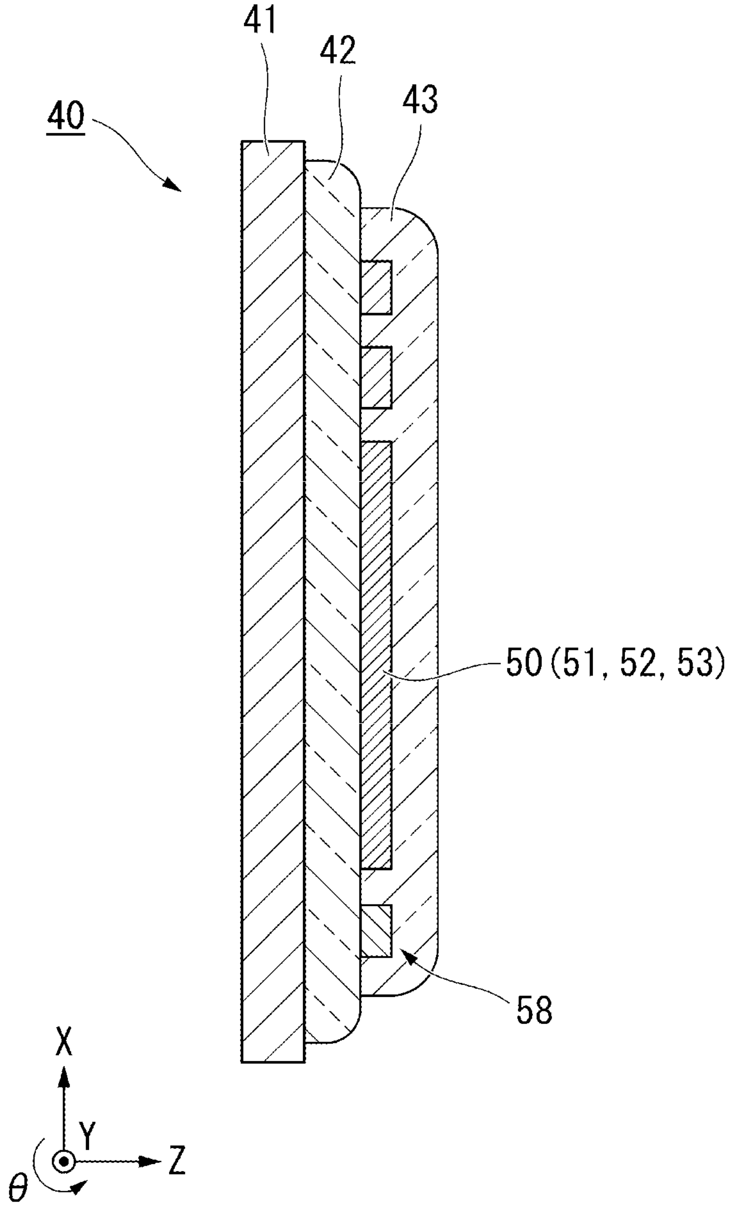
FIG. 4 is a front cross-sectional view illustrating a heater unit.
Figure 5:
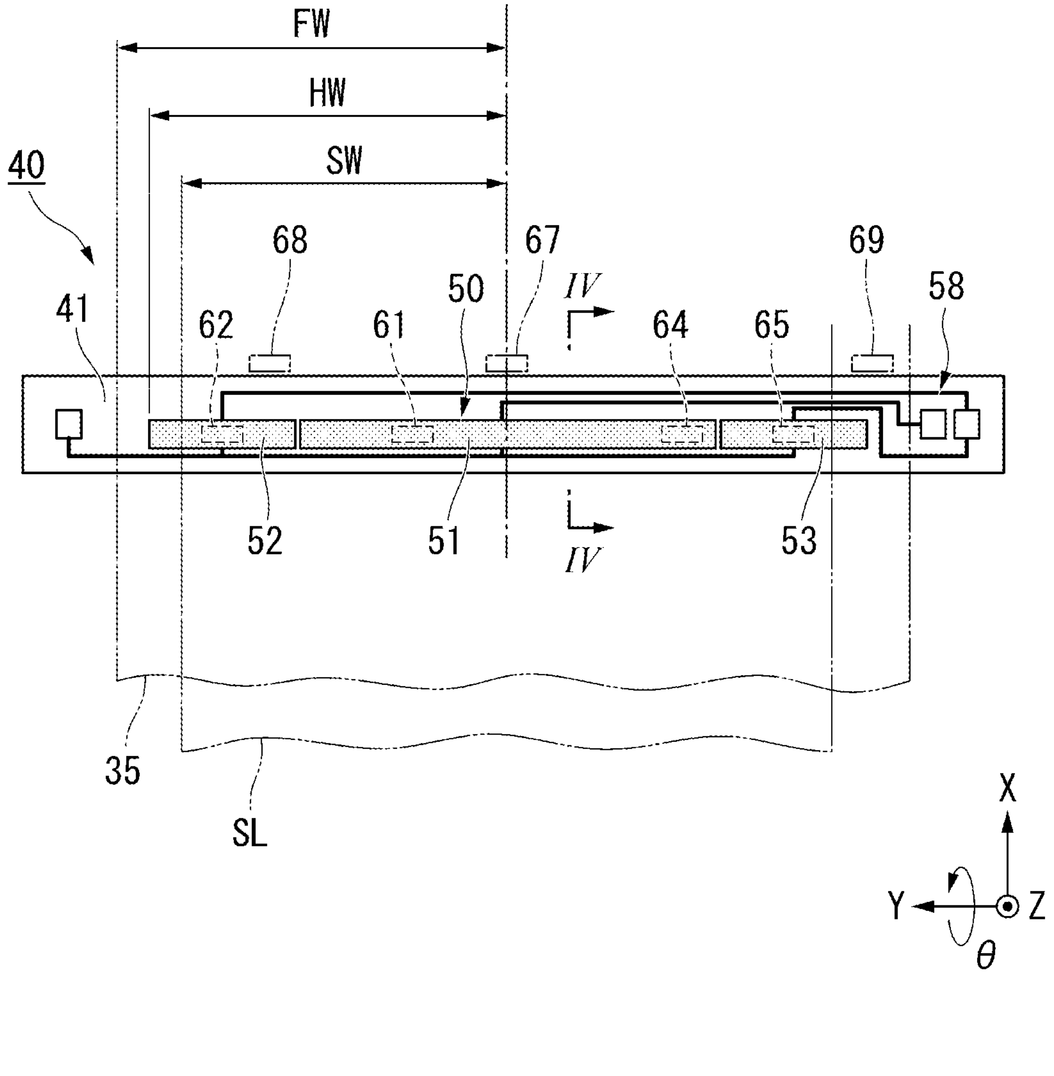
FIG. 5 is a side view illustrating the heater unit.

FIG. 4 is a front cross-sectional view illustrating the heater unit 40 taken along line IV-IV of FIG. 5. FIG. 5 is a side view illustrating the heater unit 40. The heater unit 40 includes the substrate 41, a heating element 50, and a wiring 58.

The substrate 41 is formed of, for example, a metal material such as stainless steel or a ceramic material such as aluminum nitride. As illustrated in FIG. 5, the substrate 41 has an elongated rectangular plate shape. The longitudinal direction of the substrate 41 is the axis direction of the cylindrical film 35. As illustrated in FIG. 4, an insulating layer 42 is formed of a glass material or the like on a surface of the substrate 41 in the +Z direction. As in the insulating layer 42 that is formed on the substrate 41 in the +Z direction, an insulating layer may be formed on the substrate 41 in the −Z direction.

The heating element 50 is formed of a silver-palladium alloy or the like. The heating element 50 is energized to generate heat. The heating element 50 and the wiring 58 are disposed on the surface of the substrate 41 in the +Z direction through the insulating layer 42. A protective layer 43 is formed of a glass material or the like to cover the heating element 50 and the wiring 58. As in the protective layer 43 that is formed on the substrate 41 in the +Z direction, a protective layer may be formed on the substrate 41 in the −Z direction.

As illustrated in FIG. 5, a longitudinal direction of the heating element 50 is the axis direction of the cylindrical film 35. The heating element 50 includes a center heating element (first heating element) 51 and a pair of end heating elements (second heating elements) 52 and 53. The center heating element 51 is disposed in the center portion in the Y direction. The pair of end heating elements 52 and 53 are positioned on opposite outer sides of the center heating element 51 in the Y direction. The center heating element 51 and the pair of end heating elements 52 and 53 control heat generation independently of each other. The pair of end heating elements 52 and 53 control heat generation in the same manner.

The support member 70 is formed of a resin material such as a liquid crystal polymer. As illustrated in FIG. 3, the support member 70 is provided inside the heater unit 40 in a radial direction of the cylindrical film 35. The support member 70 supports the heater unit 40 in the −Z direction of the heater unit 40.

In the Z direction, a heat transfer member may be provided between the heater unit 40 and the support member 70. The heat transfer member is formed of a metal material having a high thermal conductivity such as copper. The external shape of the heat transfer member is the same as the external shape of the substrate 41 of the heater unit 40. The heat transfer member alleviates a temperature distribution of the heater unit 40 in the Y direction.

The frame 36 is formed of a steel sheet material or the like. The frame 36 is provided inside the cylindrical film 35. A cross-section of the frame 36 perpendicular to the Y direction has a U-shape. The frame 36 is mounted on the support member 70 in the −Z direction such that a U-shaped opening portion is covered with the support member 70. The frame 36 extends in the Y direction. Opposite end portions of the frame 36 in the Y direction are fixed to the housing 10 of the image forming apparatus 1. The frame 36 supports the heater unit 40 through the support member 70.

The thermosensitive element 60 includes heater thermometers 61 and 62, thermostats 64 and 65, and film thermometers 67, 68, and 69. For example, the heater thermometers 61 and 62 and the film thermometers 67, 68, and 69 are thermistors. The heater thermometers 61 and 62 and the thermostats 64 and 65 are disposed in the −Z direction with respect to the support member 70. The heater thermometers 61 and 62 and the thermostats 64 and 65 detect the temperature of the heater unit 40 through a through hole of the support member 70. If the detected temperature of the heater unit 40 exceeds a predetermined temperature, the thermostats 64 and 65 interrupt energization of the heating element 50.

As illustrated in FIG. 5, the heater thermometers 61 and 62 include the center heater thermometer 61 and the end heater thermometer 62. The center heater thermometer 61 is disposed in the −Z direction with respect to the center heating element 51. The center heater thermometer 61 detects the temperature of the center portion of the heater unit 40 in the Y direction. The end heater thermometer 62 is disposed in the −Z direction with respect to the first end heating element 52 among the pair of end heating elements 52 and 53. The end heater thermometer 62 detects the temperature of an end portion of the heater unit 40 in the Y direction.

The thermostats 64 and 65 include the center thermostat 64 and the end thermostat 65. The center thermostat 64 is disposed in the −Z direction with respect to the center heating element 51. The center thermostat 64 detects the temperature of the center portion of the heater unit 40 in the Y direction. The end thermostat 65 is disposed in the −Z direction with respect to the second end heating element 53 among the pair of end heating elements 52 and 53. The end thermostat 65 detects the temperature of an end portion of the heater unit 40 in the Y direction.

As illustrated in FIG. 3, the film thermometers 67, 68, and 69 come into contact with an inner circumferential surface of the cylindrical film 35 to detect the temperature of the cylindrical film 35. The film thermometers 67, 68, and 69 detect the temperature of the cylindrical film 35 in the +θ direction of the heater unit 40. As schematically illustrated in FIG. 5, the film thermometers 67, 68, and 69 include the center film thermometer 67, the end film thermometer 68, and the external film thermometer 69. The center film thermometer 67 is disposed in the +θ direction with respect to the center heating element 51. The center film thermometer 67 detects the temperature of the center portion of the cylindrical film 35 in the Y direction. The end film thermometer 68 is disposed in the +θ direction with respect to the first end heating element 52 among the pair of end heating elements 52 and 53. The end film thermometer 68 detects the temperature of an end portion of the cylindrical film 35 in the Y direction.

The image forming apparatus 1 forms an image on standard size sheets of various sizes. The standard size sheets of various sizes are conveyed together with the rotation of the cylindrical film 35 while being in contact with an outer surface of the cylindrical film 35 of the fixing device 30. Among the sizes of the standard size sheets, A series sizes such as A4 are defined by the international standard ISO 216 that defines the dimensions of paper. B series sizes such as B5 are defined by ISO 216 or the Japanese industrial standards JIS-B series. LT represents a letter size and is defined by ANSI A of the American national standards institute ANSI/ASME Y14.1. LG represents the legal size. Among the standard size sheets that are conveyed together with the rotation of the cylindrical film 35 while being in contact with the outer surface of the cylindrical film 35 according to the embodiment, a standard size sheet having a maximum width in the Y direction is defined as a maximum standard size sheet SL.

A center portion of the standard size sheet in the Y direction is matched to a center portion of the fixing device 30 in the Y direction, and the standard size sheet passes through the fixing device 30. The distance from a center portion of the maximum standard size sheet SL in the Y direction to an end portion thereof is a sheet half-width SW. The distance from the center portion of the maximum standard size sheet SL in the Y direction to an end portion of the heating element 50 in the Y direction is a heater half-width HW. The heater half-width HW is longer than the sheet half-width SW. The distance from the center portion of the maximum standard size sheet SL in the Y direction to the end portion of the cylindrical film 35 in the Y direction is a film half-width FW. The film half-width FW is longer than the sheet half-width SW and the heater half-width HW.

The external film thermometer 69 is provided on an outer side of the maximum standard size sheet SL in the Y direction. The external film thermometer 69 is disposed in the +θ direction with respect to the end portion of the heating element 50 in the Y direction. The external film thermometer 69 detects the temperature of the cylindrical film 35 on the outer side of the maximum standard size sheet SL in the Y direction.

First Embodiment

Guide portions 71 and 72 will be described in detail.

As illustrated in FIG. 3, the guide portions 71 and 72 are disposed along the inner surface of the cylindrical film 35. The outer surfaces of the guide portions 71 and 72 are substantially cylindrical surfaces and can come into contact with the inner surface of the cylindrical film 35. The guide portions 71 and 72 guide the rotation of the cylindrical film 35 having a substantially cylindrical shape.

The guide portions 71 and 72 are parallel to the heater unit 40 in the θ direction. The guide portions 71 and 72 are integrated with the support member 70 and are formed of a resin material such as a liquid crystal polymer. The guide portions 71 and 72 may be provided separately from the support member 70. The guide portions 71 and 72 include the first guide portion 71 and the second guide portion 72. The first guide portion 71 is disposed in the +θ direction (the first side, the downstream side) with respect to the heater unit 40. The second guide portion 72 is disposed in the −θ direction (the second side, the upstream side) with respect to the heater unit 40.

Figure 6:
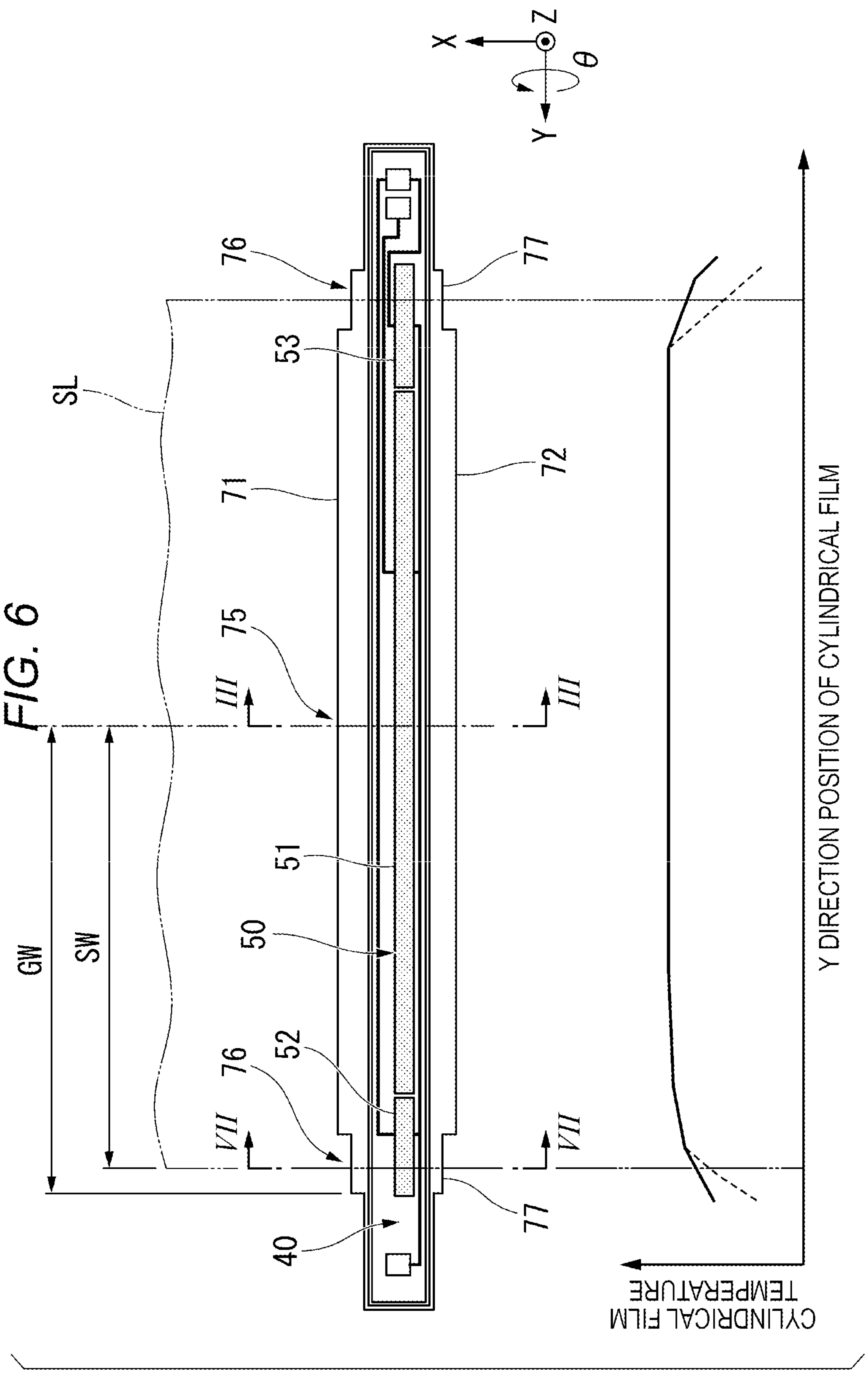
FIG. 6 is a side view illustrating a heater unit and guide portions according to a first embodiment and is a graph illustrating a temperature distribution of a cylindrical film.
Figure 7:
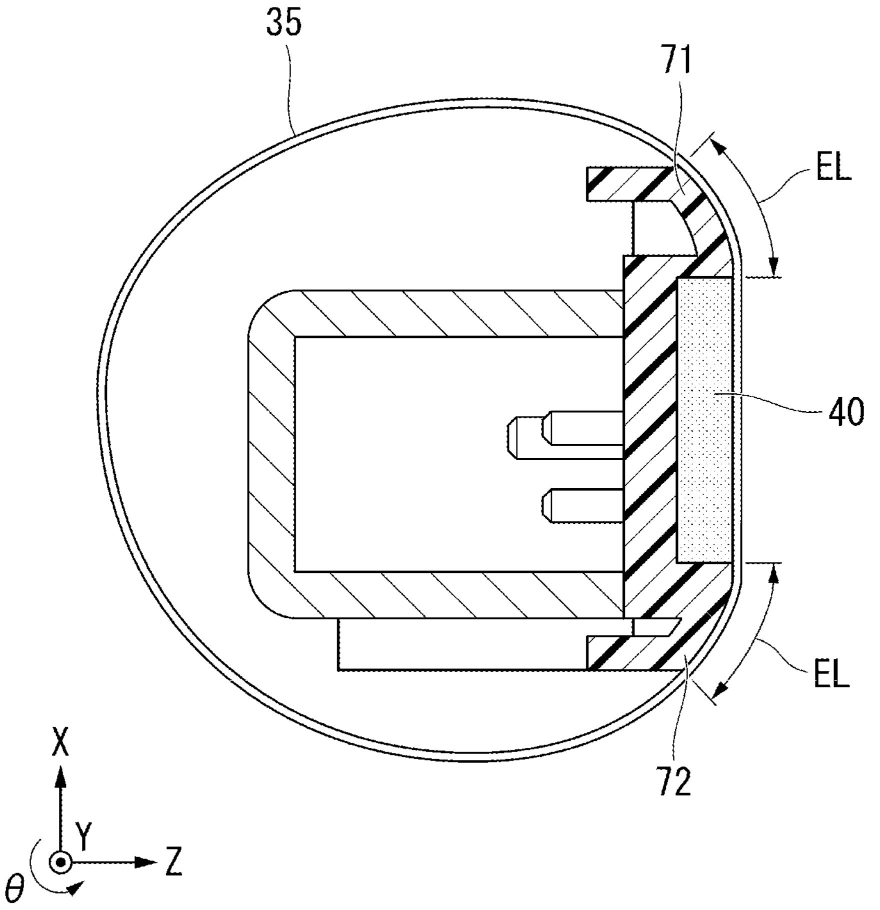
FIG. 7 is a front cross-sectional view taken along line VII-VII of FIG. 6.

FIG. 6 is a side view illustrating the heater unit 40 and the guide portions 71 and 72 according to the first embodiment and is a graph illustrating a temperature distribution of the cylindrical film 35. FIG. 7 is a front cross-sectional view taken along line VII-VII of FIG. 6. As illustrated in FIG. 6, the distance from the center portion of the maximum standard size sheet SL in the Y direction to an end portion of the guide portions 71 and 72 in the Y direction is a guide half-width GW. The guide half-width GW is longer than the sheet half-width SW. The guide portions 71 and 72 guide the cylindrical film 35 in a range where at least the cylindrical film 35 is in contact with the maximum standard size sheet SL in the Y direction. The posture of the cylindrical film 35 and the maximum standard size sheet SL in the nip N is stable. The fixing quality of the toner image of the maximum standard size sheet SL is improved. The guide half-width GW is the same as the heater half-width HW.

A first position 75 of the guide portions 71 and 72 is a position corresponding to the center portion of the maximum standard size sheet SL in the Y direction. A second position 76 of the guide portions 71 and 72 is a position corresponding to the end portion of the maximum standard size sheet SL in the Y direction. The contact length of the guide portions 71 and 72 with the cylindrical film 35 in the θ direction will also be simply referred to as "the contact length of the guide portions 71 and 72 in the θ direction". As illustrated in FIG. 3, the contact length of the guide portions 71 and 72 in the θ direction at the first position 75 is a center portion contact length CL. As illustrated in FIG. 7, the contact length of the guide portions 71 and 72 in the θ direction at the second position 76 is an end portion contact length EL. Each of the center portion contact length CL and the end portion contact length EL is the sum of the contact length of the first guide portion 71 in the θ direction and the contact length of the second guide portion 72 in the θ direction. The end portion contact length EL is shorter than the center portion contact length CL. The position of the end portion of the first guide portion 71 in the +θ direction at the second position 76 is positioned in the −θ direction further than the position of the end portion of the first guide portion 71 in the +θ direction at the first position 75. The position of the end portion of the second guide portion 72 in the −θ direction at the second position 76 is positioned in the +θ direction further than the position of the end portion of the second guide portion 72 in the −θ direction at the first position 75.

As illustrated in FIG. 6, in the end portion of the guide portions 71 and 72 in the Y direction, a tip region 77 where the contact length in the θ direction is shorter than that of the center portion in the Y direction is formed. The contact length of the guide portions 71 and 72 in the θ direction in the tip region 77 is a given end portion contact length EL (refer to FIG. 7). The tip region 77 is positioned on the outer side in the Y direction further than a boundary portion between the center heating element 51 and the end heating elements 52 and 53.

Before the start of heat generation of the heater unit 40, the temperature of the cylindrical film 35 is room temperature. At the start of operation of the image forming apparatus 1, the control unit 6 causes the heating element 50 of the heater unit 40 to generate heat such that the cylindrical film 35 is heated. The graph of FIG. 6 illustrates the temperature distribution of the cylindrical film 35 in the Y direction after a predetermined period of time elapses from the start of heat generation of the heater unit 40. In the end portion of the cylindrical film 35 in the Y direction, heat leaks to the outer side in the Y direction. The temperature of the end portion of the cylindrical film 35 in the Y direction is lower than the temperature of the center portion of the cylindrical film 35 in the Y direction. In a fixing device according to a comparative example indicated by a broken line, a decrease in the temperature of the end portion in the Y direction is large. The control unit 6 causes the amount of heat generated from the pair of end heating elements 52 and 53 illustrated in FIG. 5 to be more than the amount of heat generated from the center heating element 51. The control unit 6 starts the fixing process after causing the temperature of the end portion of the cylindrical film 35 in the Y direction to be a predetermined value or higher and causing the temperature distribution in the Y direction to be uniform. A reduction in the period of time taken to start the fixing process is required.

The heater unit 40 illustrated in FIG. 3 comes into contact with the cylindrical film 35 and heats the cylindrical film 35. The cylindrical film 35 rotates and comes into contact with the guide portions 71 and 72. Heat of the cylindrical film 35 leaks to the guide portions 71 and 72.

In the guide portions 71 and 72 according to the first embodiment, the end portion contact length EL illustrated in FIG. 7 is shorter than the center portion contact length CL illustrated in FIG. 3. Heat in the end portion of the cylindrical film 35 in the Y direction is not likely to leak to the guide portions 71 and 72. In the fixing device 30 according to the first embodiment indicate by a solid line in the graph of FIG. 6, a decrease in the temperature of the end portion in the Y direction is less than that of the fixing device according to the comparative example indicated by the broken line. Within a short period of time from the start of heat generation of the heater unit 40, the temperature of the end portion of the cylindrical film 35 in the Y direction becomes a predetermined value or more, and the temperature distribution in the Y direction becomes uniform. The period of time taken to start the fixing process can be reduced.

After the start of the fixing process, a plurality of sheets S pass through the fixing device 30. Since the contact opportunity of the center portion of the cylindrical film 35 in the Y direction with the sheet S is large, the temperature of the center portion of the cylindrical film 35 in the Y direction is not likely to increase. Since the contact opportunity of the end portion of the cylindrical film 35 in the Y direction with the sheet S is small, the temperature of the end portion of the cylindrical film 35 in the Y direction is likely to increase. The control unit 6 causes the external film thermometer 69 illustrated in FIG. 5 to detect the temperature of the cylindrical film 35 on the outer side of the maximum standard size sheet SL in the Y direction. If the temperature is a predetermined value or higher, the control unit 6 causes the amount of heat generated from the pair of end heating elements 52 and 53 to be less than the amount of heat generated from the center heating element 51. An increase in the temperature of the end portion of the cylindrical film 35 in the Y direction is suppressed.

As described above in detail, the fixing device 30 according to the first embodiment includes the cylindrical film 35, the heater unit 40, and the guide portions 71 and 72. The heater unit 40 is disposed inside the cylindrical film 35, and includes the heating element 50 of which the longitudinal direction is the axis direction of the cylindrical film 35. The guide portions 71 and 72 can come into contact with the inner surface of the cylindrical film 35 and are parallel to the heater unit 40 in the circumferential direction of the cylindrical film 35. Among the standard size sheets that are conveyed together with the rotation of the cylindrical film 35 while being in contact with the outer surface of the cylindrical film 35, the standard size sheet having a maximum width in the Y direction is set as the maximum standard size sheet SL. The position corresponding to the center portion of the maximum standard size sheet SL in the Y direction is set as the first position 75. The position corresponding to the end portion of the maximum standard size sheet SL in the Y direction is set as the second position 76. In the guide portions 71 and 72, the end portion contact length EL in the θ direction at the second position 76 is shorter than the center portion contact length CL in the θ direction at the first position 75.

At the start of heat generation of the heater unit 40, heat in the end portion of the cylindrical film 35 in the Y direction is not likely to leak to the guide portions 71 and 72. Within a short period of time from the start of heat generation of the heater unit 40, the temperature of the end portion of the cylindrical film 35 in the Y direction becomes a predetermined value or more, and the temperature distribution in the Y direction becomes uniform. The period of time taken to start the fixing process can be reduced.

The heating element 50 includes the center heating element 51 and the end heating elements 52 and 53. The center heating element 51 is disposed in the center portion in the Y direction. The end heating elements 52 and 53 are disposed in the end portions in the Y direction and can control heat generation independently of the center heating element 51.

At the start of heat generation of the heater unit 40, the control unit 6 causes the amount of heat generated from the end heating elements 52 and 53 to be more than the amount of heat generated from the center heating element 51. The period of time taken to start the fixing process can be reduced. At the start of the fixing process, the control unit 6 causes the amount of heat generated from the end heating elements 52 and 53 to be less than the amount of heat generated from the center heating element 51. An increase in the temperature of the end portion of the cylindrical film 35 in the Y direction is suppressed.

In the Y direction, the heater half-width HW as the distance from the center portion of the maximum standard size sheet SL to the end portion of the heating element 50 is longer than the sheet half-width SW as the distance from the center portion of the maximum standard size sheet SL to the end portion of the maximum standard size sheet SL.

The heating element 50 heats the cylindrical film 35 in a range where at least the cylindrical film 35 is in contact with the maximum standard size sheet SL in the Y direction. The fixing quality of the toner image of the maximum standard size sheet SL is improved.

In the Y direction, the guide half-width GW as the distance from the center portion of the maximum standard size sheet SL to the end portion of the guide portions 71 and 72 is longer than the sheet half-width SW as the distance from the center portion of the maximum standard size sheet SL to the end portion of the maximum standard size sheet SL.

The guide portions 71 and 72 guide the cylindrical film 35 in a range where at least the cylindrical film 35 is in contact with the maximum standard size sheet SL in the Y direction. The posture of the cylindrical film 35 and the maximum standard size sheet SL in the nip N is stable. The fixing quality of the toner image of the maximum standard size sheet SL is improved.

In the Y direction, the distance from the center portion of the maximum standard size sheet SL to the end portion of the cylindrical film 35 is longer than the distance from the center portion of the maximum standard size sheet SL to the end portion of the maximum standard size sheet SL.

The cylindrical film 35 is in contact with the entire range of the maximum standard size sheet SL in the Y direction. The fixing quality of the toner image of the maximum standard size sheet SL is improved.

The fixing device 30 further includes the support member 70. The support member 70 is provided inside the heater unit 40 in the radial direction of the cylindrical film 35 and supports the heater unit 40. The guide portions 71 and 72 are integrated with the support member 70.

The cost of the fixing device 30 is suppressed. The guide of the cylindrical film 35 by the guide portions 71 and 72 is stable.

The guide portions 71 and 72 include the first guide portion 71 and the second guide portion 72. The first guide portion 71 is disposed in the +8 direction with respect to the heater unit 40. The second guide portion 72 is disposed in the −θ direction with respect to the heater unit 40.

The cylindrical film 35 is stably guided by the first guide portion 71 and the second guide portion 72.

Second Embodiment

Figure 8:
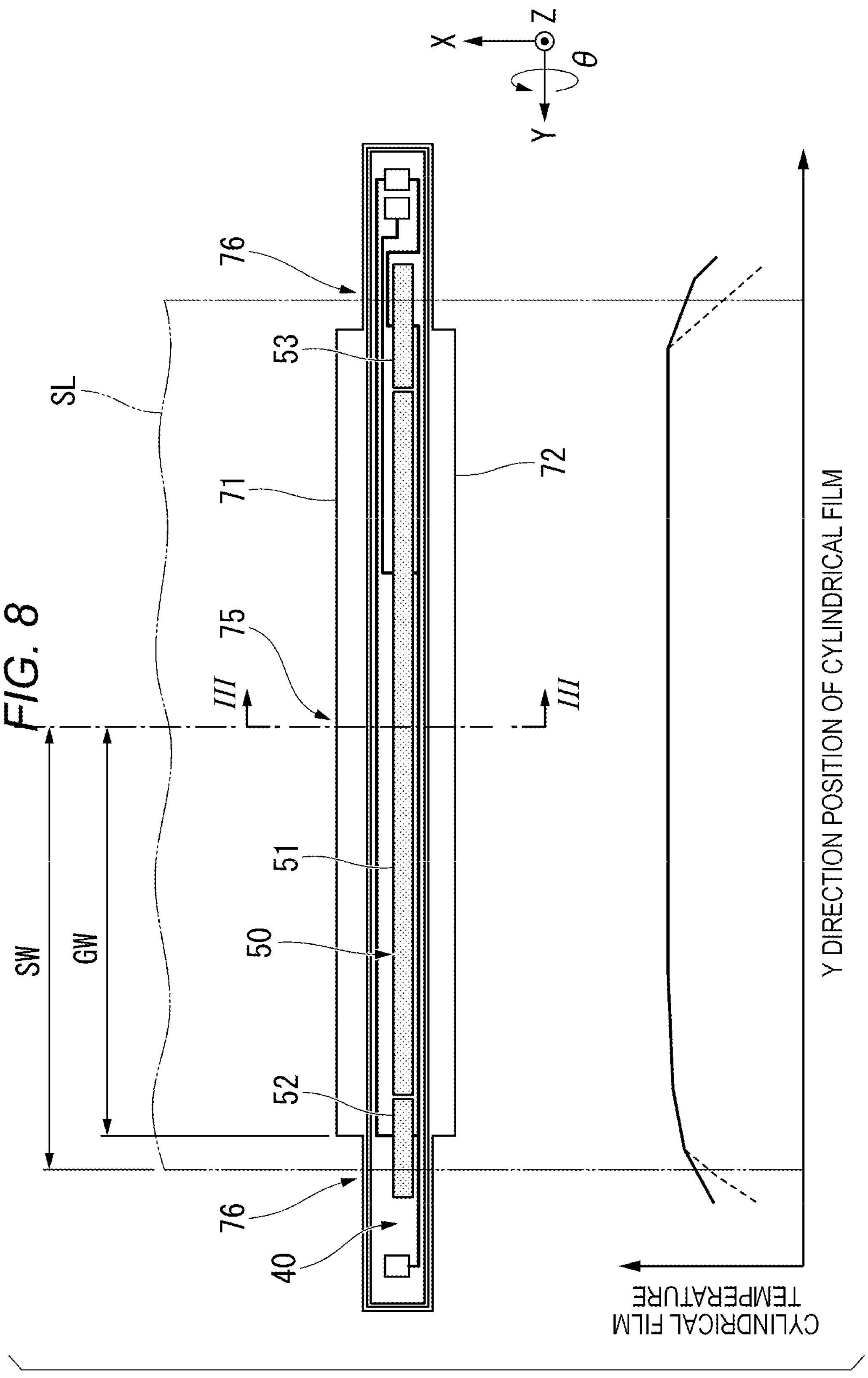
FIG. 8 is a side view illustrating a heater unit and guide portions according to a second embodiment and is a graph illustrating a temperature distribution of a cylindrical film.

FIG. 8 is a side view illustrating the heater unit 40 and the guide portions 71 and 72 according to a second embodiment and is a graph illustrating a temperature distribution of the cylindrical film 35.

In the first embodiment illustrated in FIG. 6, the guide half-width GW is longer than the sheet half-width SW. In the second embodiment illustrated in FIG. 8, the guide half-width GW is shorter than the sheet half-width SW. The description of the second embodiment regarding the same portions as those of the first embodiment will not be repeated in some cases.

As illustrated in FIG. 8, in the Y direction, the distance from the center portion of the maximum standard size sheet SL to the end portion of the guide portions 71 and 72 is a guide half-width GW. The distance from the center portion of the maximum standard size sheet SL in the Y direction to the end portion thereof is a sheet half-width SW. The guide half-width GW is shorter than the sheet half-width SW. The end portion of the guide portions 71 and 72 in the Y direction is positioned on the outer side in the Y direction further than a boundary portion between the center heating element 51 and the end heating elements 52 and 53.

The position corresponding to the end portion of the maximum standard size sheet SL in the Y direction is set as the second position 76. At the second position 76, the guide portions 71 and 72 are not provided. The end portion contact length EL (refer to FIG. 7) of the guide portions 71 and 72 in the θ direction at the second position 76 is zero. The end portion contact length EL is shorter than the center portion contact length CL illustrated in FIG. 3.

As described above in detail, in the Y direction, the guide half-width GW as the distance from the center portion of the maximum standard size sheet SL to the end portion of the guide portions 71 and 72 is shorter than the sheet half-width SW as the distance from the center portion of the maximum standard size sheet SL to the end portion of the maximum standard size sheet SL.

Heat in the end portion of the cylindrical film 35 in the Y direction is not likely to leak to the guide portions 71 and 72. In the fixing device 30 according to the second embodiment indicated by a solid line in the graph of FIG. 8, a decrease in the temperature of the end portion in the Y direction is less than that of the fixing device according to the comparative example indicated by the broken line. Within a short period of time from the start of heat generation of the heater unit 40, the temperature of the end portion of the cylindrical film 35 in the Y direction becomes a predetermined value or more, and the temperature distribution in the Y direction becomes uniform. The period of time taken to start the fixing process can be reduced.

Third Embodiment

Figure 9:
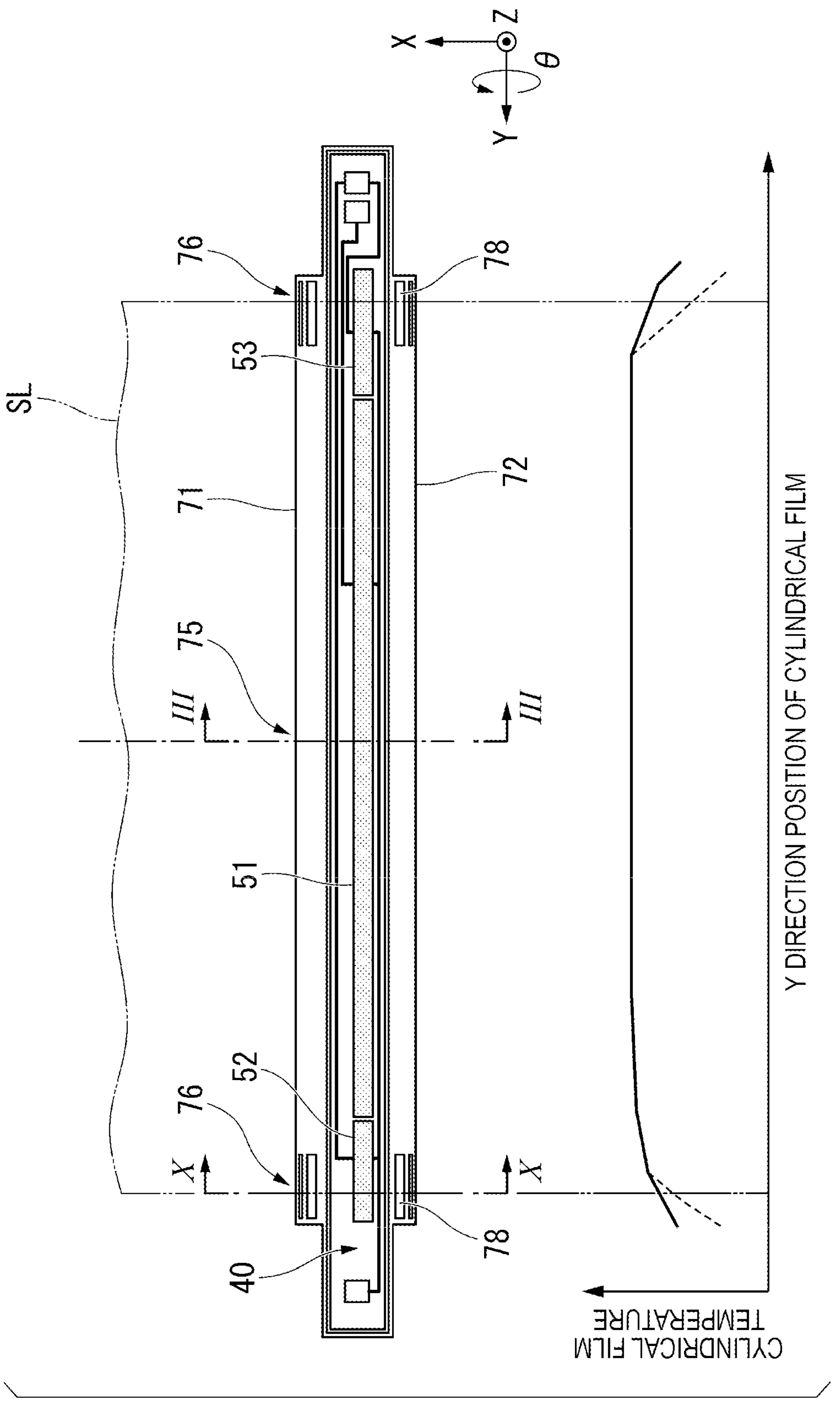
FIG. 9 is a side view illustrating a heater unit and guide portions according to a third embodiment and is a graph illustrating a temperature distribution of a cylindrical film.
Figure 10:
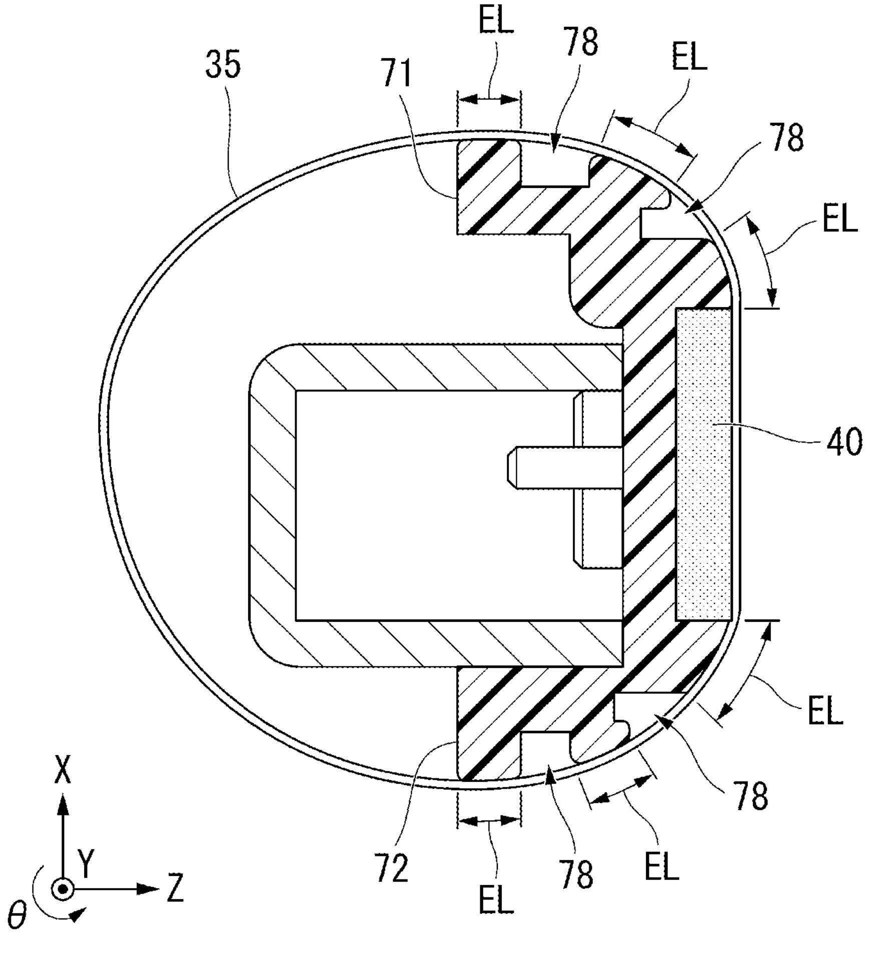
FIG. 10 is a front cross-sectional view taken along line X-X of FIG. 9.

FIG. 9 is a side view illustrating the heater unit 40 and the guide portions 71 and 72 according to a third embodiment and is a graph illustrating a temperature distribution of the cylindrical film 35. FIG. 10 is a front cross-sectional view taken along line X-X of FIG. 9.

In the third embodiment illustrated in FIG. 10, a non-contact portion 78 with the cylindrical film 35 is provided on the outer surface of the guide portions 71 and 72. The description of the third embodiment regarding the same portions as those of the first embodiment will not be repeated in some cases.

As illustrated in FIG. 9, the second position 76 of the guide portions 71 and 72 is a position corresponding to the end portion of the maximum standard size sheet SL in the Y direction. The guide portions 71 and 72 include the non-contact portion 78 with the cylindrical film 35 at the second position 76. The non-contact portion 78 is positioned on the outer side in the Y direction further than a boundary portion between the center heating element 51 and the end heating elements 52 and 53. As illustrated in FIG. 10, the non-contact portion 78 is disposed in the middle of the outer surface of the guide portions 71 and 72 in the θ direction. The non-contact portion 78 is a recess portion, a through hole, or the like. Each of the first guide portion 71 and the second guide portion 72 includes one non-contact portion 78 or a plurality of non-contact portions 78.

The position of the end portion of the first guide portion 71 in the +θ direction at the second position 76 is the same as the position of the end portion of the first guide portion 71 in the +θ direction at the first position 75. The position of the end portion of the second guide portion 72 in the −θ direction at the second position 76 is the same as the position of the end portion of the second guide portion 72 in the −θ direction at the first position 75. The cylindrical film 35 is stably guided by the guide portions 71 and 72. Since the guide portions 71 and 72 include the non-contact portion 78 at the second position 76, the end portion contact length EL of the guide portions 71 and 72 is shorter than the center portion contact length CL illustrated in FIG. 3.

As described above in detail, the guide portions 71 and 72 include the non-contact portion 78 with the cylindrical film 35 in the middle of the second position 76 in the θ direction.

Heat in the end portion of the cylindrical film 35 in the Y direction is not likely to leak to the guide portions 71 and 72. In the fixing device 30 according to the third embodiment indicated by a solid line in the graph of FIG. 9, a decrease in the temperature of the end portion in the Y direction is less than that of the fixing device according to the comparative example indicated by the broken line. Within a short period of time from the start of heat generation of the heater unit 40, the temperature of the end portion of the cylindrical film 35 in the Y direction becomes a predetermined value or more, and the temperature distribution in the Y direction becomes uniform. The period of time taken to start the fixing process can be reduced.

Fourth Embodiment

Figure 11:
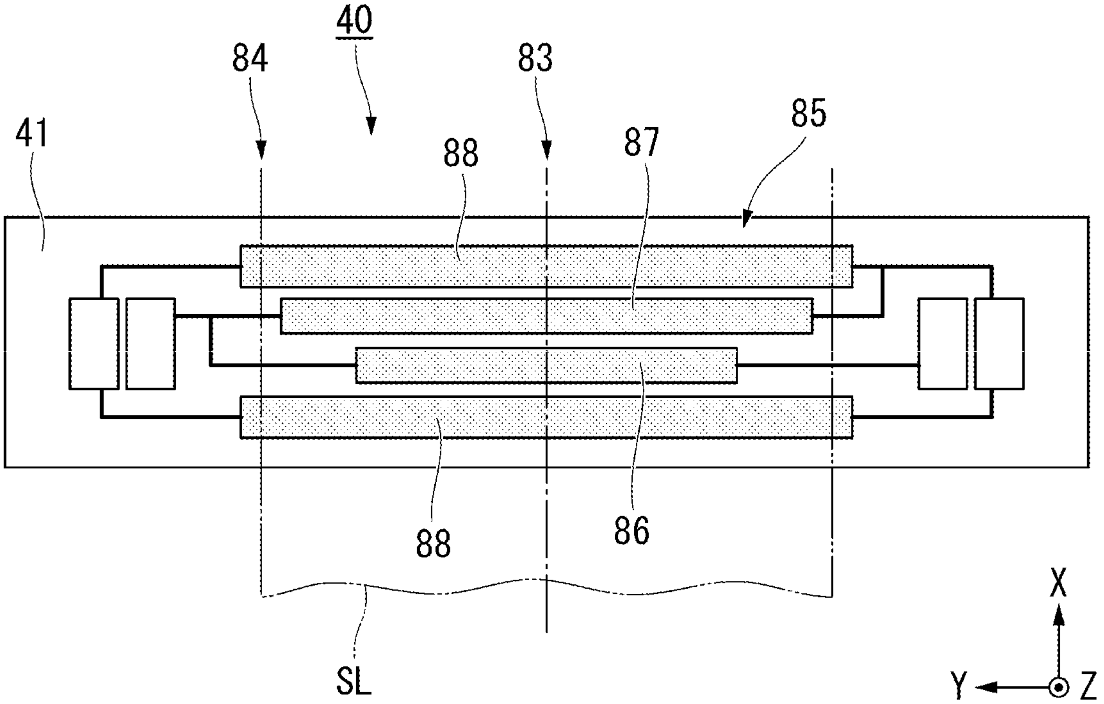
FIG. 11 is a side view illustrating a heater unit according to a fourth embodiment.

FIG. 11 is a side view illustrating the heater unit 40 according to a fourth embodiment. The description of the fourth embodiment regarding the same portions as those of the first embodiment will not be repeated in some cases.

The heater unit 40 includes a heating element 85 on the surface of the substrate 41. The heating element 85 is long in the Y direction. The heating element 85 has a plane-symmetrical shape with respect to an XZ plane at the center of the substrate 41 in the Y direction.

The heating element 85 includes a first sub-heater 86, a second sub-heater 87, and a pair of main heaters 88. Each of the first sub-heater 86, the second sub-heater 87, and the pair of main heaters 88 has a rectangular shape of which a longitudinal direction is the Y direction. The pair of main heaters 88 are disposed in opposite end portions of the substrate 41 in the X direction. The first sub-heater 86 and the second sub-heater 87 are disposed in a center portion of the substrate 41 in the X direction. Regarding the length of the heating element 85 in the Y direction, the first sub-heater 86 is the shortest, and the pair of main heaters 88 are the longest. The length of the second sub-heater 87 in the Y direction is longer than that of the first sub-heater 86 and is shorter than that of the pair of main heaters 88.

For example, if the fixing process is executed on the sheet S having a small width in the Y direction, the control unit 6 causes the first sub-heater 86 or the second sub-heater 87 to generate heat. For example, if the fixing process is executed on the sheet S having a large width in the Y direction, the control unit 6 causes the pair of main heaters 88 to generate heat. All of the heaters in the heating element 85 are disposed in the center portion of the substrate 41 in the Y direction. Irrespective of the size of the sheet S, the center portion of the heater unit 40 in the Y direction generates heat.

A third position 83 of the heater unit 40 corresponds to a position of the center portion of the maximum standard size sheet SL in the Y direction. A fourth position 84 of the heater unit 40 corresponds to a position of an end portion of the maximum standard size sheet SL in the Y direction. The heating element 85 includes the first sub-heater 86 and the second sub-heater 87 (heating element segments) where the amount of heat generated from the fourth position 84 is less than the amount of heat generated from the third position 83. After the start of the fixing process, the control unit 6 causes the amount of heat generated from the first sub-heater 86 and the second sub-heater 87 to be more than the amount of heat generated from the pair of main heaters 88. An increase in the temperature of the end portion of the cylindrical film 35 in the Y direction is suppressed.

Fifth Embodiment

Figure 12:
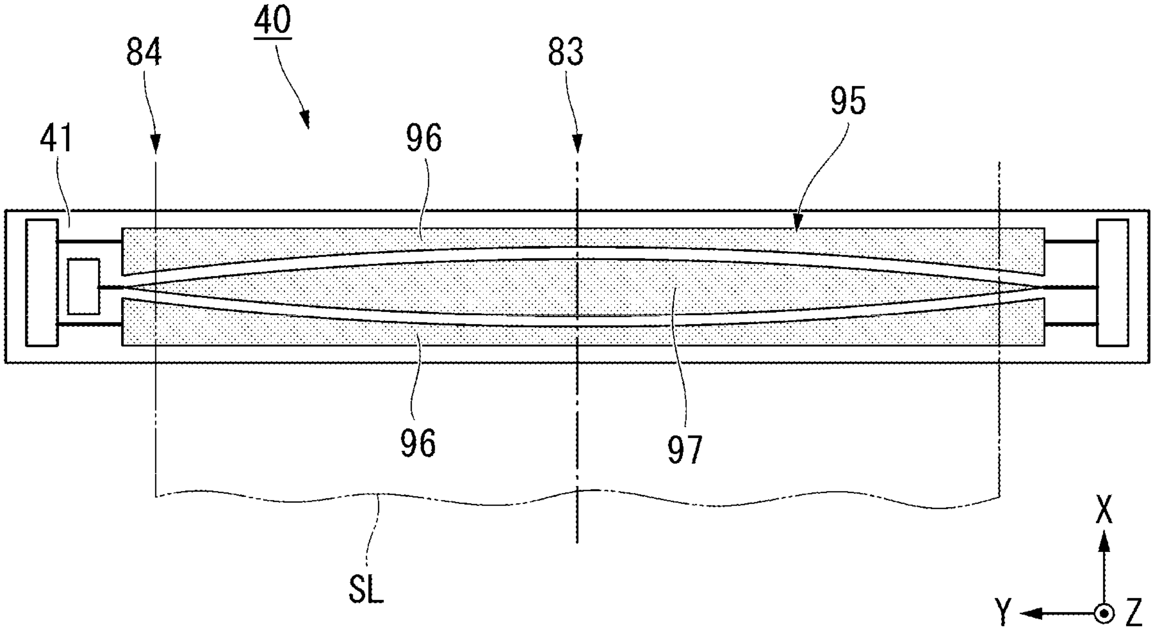
FIG. 12 is a side view illustrating a heater unit according to a fifth embodiment.

FIG. 12 is a side view illustrating the heater unit 40 according to a fifth embodiment. The description of the fifth embodiment regarding the same portions as those of the first embodiment will not be repeated in some cases.

The heater unit 40 includes a heating element 95 on the surface of the substrate 41. The heating element 95 is long in the Y direction. The heating element 95 has a plane-symmetrical shape with respect to an XZ plane at the center of the substrate 41 in the Y direction.

The heating element 95 includes a pair of main heaters 96 and a sub-heater 97. The pair of main heaters 96 are disposed in opposite end portions of the substrate 41 in the X direction. The sub-heater 97 is disposed in the center portion of the substrate 41 in the X direction. The lengths of the pair of main heaters 96 and the sub-heater 97 in the Y direction are the same. The width of the main heaters 96 in the X direction is small in the center portion in the Y direction and increases from the center portion toward the opposite end portions in the Y direction. The amount of heat generated from the main heaters 96 is large in the center portion in the Y direction and decreases from the center portion toward the opposite end portions in the Y direction. The width of the sub-heater 97 in the X direction is large in the center portion in the Y direction and decreases from the center portion toward the opposite end portions in the Y direction. The amount of heat generated from the sub-heater 97 is small in the center portion in the Y direction and increases from the center portion toward the opposite end portions in the Y direction.

For example, if the fixing process is executed on the sheet S having a small width in the Y direction, the control unit 6 causes the pair of main heaters 96 to generate heat. For example, if the fixing process is executed on the sheet S having a large width in the Y direction, the control unit 6 causes the pair of main heaters 96 and the sub-heater 97 to generate heat. In the fifth embodiment, the pair of main heaters 96 generate heat irrespective of the size of the sheet S. The amount of heat generated from the pair of main heaters 96 is large in the center portion in the Y direction.

The third position 83 of the heater unit 40 corresponds to the position of the center portion of the maximum standard size sheet SL in the Y direction. The fourth position 84 corresponds to the position of the end portion of the maximum standard size sheet SL in the Y direction. The heating element 95 includes the pair of main heaters 96 (heating element segments) where the amount of heat generated from the fourth position 84 is less than the amount of heat generated from the third position 83. After the start of the fixing process, the control unit 6 causes the amount of heat generated from the pair of main heaters 96 to be more than the amount of heat generated from the sub-heater 97. An increase in the temperature of the end portion of the cylindrical film 35 in the Y direction is suppressed.

The heating element 95 includes the sub-heater 97 where the amount of heat generated from the fourth position 84 is more than the amount of heat generated from the third position 83. At the start of heat generation of the heater unit 40, the control unit 6 causes the amount of heat generated from the sub-heater 97 to be more than the amount of heat generated from the pair of main heaters 96. The period of time taken to start the fixing process can be reduced.

In at least one of the embodiments described above, the guide portions 71 and 72 where the end portion contact length EL is shorter than the center portion contact length CL are provided. As a result, the period of time taken to start the fixing process can be reduced.

While certain embodiments have been described these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A fixing device comprising:

a film-shaped cylinder;

a heater disposed inside the cylinder, the heater including a heating element having a longitudinal direction which is an axis direction of the cylinder; and a guide portion configured to come into contact with an inner surface of the cylinder, the guide portion being parallel to the heater in a circumferential direction of the cylinder, the guide portion being configured such that, when a standard size sheet having a maximum width in the longitudinal direction among standard size sheets that are conveyed together with rotation of the cylinder while being in contact with an outer surface of the cylinder, is set as a maximum standard size sheet, a position corresponding to a center portion of the maximum standard size sheet in the longitudinal direction is set as a first position, and a position corresponding to an end portion of the maximum standard size sheet in the longitudinal direction is set as a second position, a contact length with the cylinder in the circumferential direction at the second position is shorter than a contact length with the cylinder in the circumferential direction at the first position, wherein the guide portion includes a non-contact portion with the cylinder in a middle of the second position in the circumferential direction.

2. The device according to claim 1, wherein in the longitudinal direction, a distance, from the center portion of the maximum standard size sheet to an end portion of the guide portion, is shorter than a distance from the center portion of the maximum standard size sheet to the end portion of the maximum standard size sheet.

3. The device according to claim 1, wherein the heating element includes a first heating element and a second heating element, the first heating element disposed in a center portion in the longitudinal direction, the second heating element disposed in an end portion in the longitudinal direction and configured to control heat generation independently of the first heating element.

4. The device according to claim 1, wherein in the longitudinal direction, a distance from the center portion of the maximum standard size sheet to an end portion of the heating element is longer than a distance from the center portion of the maximum standard size sheet to the end portion of the maximum standard size sheet.

5. The device according to claim 1, wherein in the longitudinal direction, a distance from the center portion of the maximum standard size sheet to an end portion of the guide portion is longer than a distance from the center portion of the maximum standard size sheet to the end portion of the maximum standard size sheet.

6. The device according to claim 1, wherein in the longitudinal direction, a distance from the center portion of the maximum standard size sheet to an end portion of the cylinder is longer than a distance from the center portion of the maximum standard size sheet to the end portion of the maximum standard size sheet.

7. The device according to claim 1, further comprising a support member configured to support the heater, the support member disposed inside the heater in a radial direction of the cylinder, wherein the guide portion is integrated with the support member.

8. The device according to claim 1, wherein the guide portion includes a first guide portion and a second guide portion, the first guide portion positioned on a first side of the heater in the circumferential direction, the second guide portion positioned on a second side opposite to the first side of the heater in the circumferential direction.

9. The device according to claim 1, wherein the heating element includes a heating element segment where an amount of heat generated from a third position corresponding to the center portion of the maximum standard size sheet is less than an amount of heat generated from a fourth position corresponding to the end portion of the maximum standard size sheet.

10. An image forming apparatus comprising the fixing device of claim 1.

11. The device according to claim 1, further comprising: a support arranged to support the heater.

12. The device according to claim 1, wherein the heater includes a rectangular shaped substrate.

13. The device according to claim 1, wherein the heating element comprises a silver-palladium alloy material.

14. The device according to claim 1, wherein the standard size sheet is paper.

15. The device according to claim 1, further comprising a pressure roller arranged to supply pressure to a sheet.

16. The device according to claim 15, further comprising a heating roller arranged to provide heat to the sheet and separated from the pressure roller at a nip.

17. The device according to claim 16, wherein the film-shaped cylinder is disposed on an outer surface of the heating roller.

* * * * *